United States Patent [19]
Leibman

[11] Patent Number: 6,077,015
[45] Date of Patent: Jun. 20, 2000

[54] QUICK INSERTION SCREW

[75] Inventor: Bernard Leibman, Webster, N.Y.

[73] Assignee: Xerox Corporation, Stamford, Conn.

[21] Appl. No.: 09/248,358

[22] Filed: Feb. 10, 1999

[51] Int. Cl.$^7$ .............................. F16B 21/00; F16B 35/04
[52] U.S. Cl. .......................... 411/418; 411/349; 411/551
[58] Field of Search ................................. 411/349, 549, 411/550, 551, 553, 418, 420

[56] References Cited

U.S. PATENT DOCUMENTS

| | | | |
|---|---|---|---|
| 2,442,064 | 5/1948 | Veit | 411/349 |
| 2,730,154 | 1/1956 | Aspey | 411/418 X |
| 3,942,406 | 3/1976 | Egner | 411/418 |
| 4,010,671 | 3/1977 | Hubbard et al. | 411/418 X |
| 4,208,082 | 6/1980 | Davies et al. | 339/45 M |
| 4,228,723 | 10/1980 | Cunningham | 81/460 |
| 4,322,022 | 3/1982 | Bergman | 222/327 |
| 4,485,944 | 12/1984 | Eichholz | 222/390 |
| 4,620,760 | 11/1986 | Duncan | 339/45 M |
| 5,042,379 | 8/1991 | Greer | 101/216 |
| 5,063,642 | 11/1991 | Toth | 24/274 R |
| 5,230,596 | 7/1993 | Morad | 411/433 |
| 5,246,322 | 9/1993 | Salice | 411/349 X |
| 5,816,672 | 10/1998 | LaPointe et al. | 312/223.2 |

*Primary Examiner*—Neill Wilson
*Attorney, Agent, or Firm*—John S. Wagley; Andrew D. Ryan

[57] ABSTRACT

A fastener for securing a first component to a second component in a device is disclosed. The fastener includes an elongated body and a head. The elongated body has a portion thereof having a cross section perpendicular to a longitudinal axis of the body. The portion of the body has an arcuate connecting surface on an external periphery thereof. The body cooperates with the first component to permit the portion of the body to freely pass through a first component opening in the first component. The body cooperates with the second component to permit the portion of the body to freely pass through a second component opening in the second component when the body is oriented in a first position with respect to the second component opening. The body cooperates with the second component to permit the arcuate connecting surface to engage with the second component when the body is oriented in a second position with respect to the second component opening. The head is attached to one end of the elongated body. The head and the arcuate connecting surface cooperate to secure the first component and the second component to each other.

21 Claims, 10 Drawing Sheets

QUICK INSERTION SCREW

BACKGROUND OF THE INVENTION

The present invention relates to an apparatus for printing machines. More specifically, the invention relates to a fastener for a printing machine.

The features of the present invention are useful for any machine which requires joining of mechanical components, for example, printing machines such as electrophotographic printing machines.

In the process of electrophotographic printing, a photoconductive surface is charged to a substantially uniform potential. The photoconductive surface is image wise exposed to record an electrostatic latent image corresponding to the informational areas of an original document being reproduced. This records an electrostatic latent image on the photoconductive surface corresponding to the informational areas contained within the original document. Thereafter, a marking material such as toner particles is transported into contact with the electrostatic latent image in a region known as the development zone. Toner particles are attracted from the magnetic roller to the latent image. The resultant toner powder image is then transferred from the photoconductive surface to a copy sheet and permanently affixed thereto. The foregoing generally describes a typical mono-color single component development electrophotographic copying machine.

Machines and mechanical assemblies consist of a plurality of components that must interact and be interconnected. Fasteners are used to secure the components to each other. The use of fasteners represents several problems. The first of these problems is that fasteners add to the cost of the mechanism or machine. Further, the fastener itself may represent a component which may fail or wear causing the machine to not operate properly. Further, the use of fasteners requires manufacturing time to install the fasteners to interconnect the components during assembly of the machines and further the removal of the fasteners represents a cost associated with remanufacturing the machines.

Recently to conserve natural resources and provide for machine with improved features and more reliable newer technology, machinery is now often remanufactured. The remanufacture of machinery requires that the components often be disassembled. The need for disassembly necessitates the need to remove fasteners. The time to remove fasteners may be a significant issue in the remanufacturing cost.

Components have typically been joined together with the use of fasteners in the form of welding, rivets or screws. Rivets require the use of special machinery to assemble, may become loose and rattle during use and are difficult and expensive to remove for remanufacturing. Screws have disadvantages in that they require a significant amount of assembly time, may become loose during use and may become very time consuming to remove.

Attempts have been made to find fasteners which may be more quickly assembled and disassembled for remanufacturing. For example, one type of connector utilized to reduce assembly and disassembly time is a bayonet connector. The bayonet connector includes protrusions which match with slots on the components to be assembled. Protrusions on the bayonet connector interconnect with slots upon the insertion and rotation of the bayonet connector. Such type of bayonet connectors are expensive and provide for a weak connection between the protrusions and slots thereby having limited life and may only be used where the connecting forces are not large.

The following disclosures may be relevant to various aspects of the present invention:

U.S. Pat. No. 5,816,672

Patentee: LaPointe, et al.

Issue Date: Oct. 6, 1998

U.S. Pat. No. 5,230,596

Patentee: Morad

Issue Date: Jul. 27, 1993

U.S. Pat. No. 5,063,642

Patentee: Toth

Issue Date: Nov. 12, 1991

U.S. Pat. No. 5,042,379

Patentee: Greer

Issue Date: Aug 27, 1991

U.S. Pat. No. 4,620,760

Patentee: Duncan

Issue Date: Nov. 4, 1986

U.S. Pat. No. 4,485,944

Patentee: Eichholz

Issue Date: Dec. 4, 1984

U.S. Pat. No. 4,322,022

Patentee: Bergman

Issue Date: Mar. 30, 1982

U.S. Pat. No. 4,228,723

Patentee: Cunningham

Issue Date: Oct. 21, 1980

U.S. Pat. No. 4,208,082

Patentee: Davies et al.

Issue Date: Jun. 17, 1980

U.S. Pat. No. 5,816,672 discloses an apparatus and a method for securing a component in an electronics housing utilizing an apparatus including a rail attached to a side portion of an electronics housing, a door slidably coupled to the rail, a bezel coupled to the electronics housing and covering a portion of the rail, and a multiple position locking mechanism coupled to the rear of the bezel. The apparatus is used to cover and secure the external components of a server wherein the server contains one or more removable external components that are data drives and the media in those data drives. The locking mechanism includes a rotatable switch lock connected to an axial moving link that rotates a specially designed shaft that contains predetermined locking locations to contact a protruding rib portion of the door and hold or lock the door in a particular position. The multiple position locking mechanism contemplates that the door will be locked in such a position so as to prohibit the removal of the external components completely or alternatively prohibit removal of the external components that are, for example, the data drives, but allow the removal from the electronics housing of the external components that are the media within those drives. Thus, for example, there is a locking position of the door such that a floppy disk on CDROM is removable, whereas the drives that cover the media are not removable.

U.S. Pat. No. 5,230,596 discloses an improved quick release locking nut for quick change type mop holders. The mop holder has a frame attachable to a mop stick and a clamping member for securing mop fill. The quick release locking nut is slidably mounted on a central shank of the frame, and has a pivotally mounted pawl which is biased by a spring. The inner screw threads on the tip of the pawl are engaged with the outer screw threads on the central shank, in order to lock the quick release locking nut on the central shank for preventing the clamping member from sliding on the central shank. When the pawl is pressed against the spring and its tip is disengaged from the central shank, the quick release locking nut is unlocked and can be slid on the central shank for allowing the clamping member to slide on the central shank so that the mop clamp can be released.

U.S. Pat. No. 5,063,642 discloses a quick release band clamp having a mounting bracket attached to one end of a flexible band. The mounting bracket has a pair of side support members straddling the flexible band. A pivoting bracket is pivotably supported between the pair of side support members by a pair of transverse trunnions and is pivotable between a closed position and an opened position. A worm screw is rotatably supported by the pivoting bracket at a location intermediate the trunnions and the band clamp. The free end of the band clamp is receivable between the mounting bracket and the pivoting bracket. The helical threads of the worm screw engage the teeth provided on the free end of the flexible band when the pivoting bracket is rotated to the closed position. In this position, the flexible band may be advanced through the mounting bracket by the rotation of the worm screw to tighten the flexible band about an object. The free end of he flexible band may be released by pivoting the pivoting bracket to the opened position in which the helical thread of the worm screw is disengaged from the teeth.

U.S. Pat. No. 5,042,379 discloses a rotary die hold down unit is carried between opposed sideframes of a printing press and includes a clamping unit carried by each sideframe and a cross member extending between said clamping units. The clamping units each include a base having quick-release pins for attachment to the sideframes. The sideframes include vertical slots and an elongate adjustment member, is received by an adaptor sleeve threadedly connected to the base and extending into the sideframe slot, the adjustment member and the sleeve cooperating to provide coarse and fine adjustment capability of the adjustment member. The cross member includes pressure blocks at each end received within the sideframe slots for engagement by the adjustment members, and a pair of spaced roller blocks having rollers engagable with the rotary die respectively at points on each side of the axis of rotation of said rotary die.

U.S. Pat. No. 4,620,760 discloses a quick release electrical connector comprises a plug part and a socket part. The socket part has an external screw thread and a coupling sleeve is captive on the plug part. Connected to the plug part is a number of internally screw threaded portions which are adapted to engage the screw thread on the socket part. The coupling sleeve has a surrounding axially movable retaining sleeve which in one position retains the screw threaded portions in engagement with the socket screw thread. In another position the retaining sleeve allows the screw threaded portions to move radially outwards out of engagement with the socket screw thread allowing quick separation of the plug and the socket part. The connector includes a thrust washer to prevent relative rotation between the plug and the coupling sleeve in the event of vibrations causing inadvertent unscrewing of the socket part.

U.S. Pat. No. 4,485,944 discloses a screw-actuated dispenser comprising a receptacle for accommodating a cartridge containing viscous material such a caulk, grease or the like. The receptacle has opposing endwalls between which the cartridge is confined. An elongate drive screw is threadably engaged with a threaded opening in the rear endwall and is extensible within and retractable from the opening and relative to the body by rotation. A slot extends partially along the length of the body and connects with the rear wall opening. A wedge is positioned in the slot, expanding the opening and urging the threads on the drive screw and those within the opening out of engagement with the screw such that the drive screw is freely slidable longitudinally relative to the receptacle. To engage the drive screw in the opening, the slot is compressed by a sleeve extended over an extension of the rear wall on opposite sides of the slot.

U.S. Pat. No. 4,322,022 discloses a drive train of the threadably advanced piston for a power caulker is provided with a quick release feature. When this feature is activated, the active portions of the drive nut of a lead screw in the drive train are disconnected from the lead screw so that internal pressure in the supply chamber of the cartridge may quickly equilibrate itself by pushing the piston and its lead screw backwards. Thus, dispensing may be smartly stopped and sharply curtailed, merely by releasing the trigger on the power hand tool and activating the quick release. Either of these acts may be performed first or both may be performed simultaneously. By preference, the quick release feature includes threaded claws that are cammed into and out of driving relation with the lead screw by a simple twist of the drive nut.

U.S. Pat. No. 4,228,723 discloses a recess for fasteners such as screws, bolts and the like having, in axial alignment with the shank, a central recess of a conic-frustum shape which serves as a natural center for a driver tool or for a drill bit if it becomes necessary to drill out the fastener. The wrenching elements consist of a plurality of truncated conic segments having their common center line axis coincident with the central recess. The wrenching walls for loosening lying in a plane containing the center line axis of the fastener while the walls for tightening being sloped toward the tightening direction to provide for torque limiting.

U.S. Pat. No. 4,208,082 discloses a quick-release electrical connector having a coupling member captive on and rotatable about a body of the connector, the member including circumferentially-spaced, forwardly-projecting tangs of polymeric material constituting a gapped barrel and having an internal screwthread thereon for engagement with an external screwthread of a mating connector. The tangs are resilient and allow rapid disconnection of the connectors upon application of an axial force sufficient to cause interaction of the internal and external screwthreads and expansion of the barrel to allow the internal screwthreads to ride over the external screwthreads. An inhibitor device is provided to selectively inhibit expansion of the barrel and separation of the connectors.

SUMMARY OF THE INVENTION

In accordance with one aspect of the present invention, there is provided a fastener for securing a first component to a second component in a device. The fastener includes an elongated body and a head. The elongated body has a portion thereof having a cross section perpendicular to a longitudinal axis of the body. The portion of the body has an arcuate connecting surface on an external periphery thereof. The body cooperates with the first component to permit the portion of the body to freely pass through a first component opening in the first component. The body cooperates with the second component to permit the portion of the body to freely pass through a second component opening in the second component when the body is oriented in a first position with respect to the second component opening. The body cooperates with the second component to permit the arcuate connecting surface to engage with the second component when the body is oriented in a second position with respect to the second component opening. The head is attached to one end of the elongated body. The head and the arcuate connecting surface cooperate to secure the first component and the second component to each other.

In accordance with another aspect of the present invention, there is provided a fastener for securing a first component to a second component in a printing machine. The fastener includes an elongated body and a head. The elongated body has a portion thereof having a cross section perpendicular to a longitudinal axis of the body. The cross section is bounded by a semi-circular portion and a linear portion connected to the semi-circular portion. The portion of the body has a spiral thread on an external periphery thereof. The body cooperates with the first component to permit the portion of the body to freely pass through a first component opening in the first component. The body cooperates with the second component to permit the portion of the body to freely pass through a second component opening in the second component when the body is oriented in a first position with respect to the second component opening. The body cooperates with the second component to permit the spiral thread to engage with the second component when the body is rotated with respect to the second component about the longitudinal axis. The head is attached to one end of the elongated body. The head and the spiral thread cooperate to secure the first component and the second component to each other.

In accordance with yet another aspect of the present invention, there is provided a printing machine of the type having a fastener for securing a first component to a second component. The fastener includes an elongated body and a head. The elongated body has a portion thereof having a cross section perpendicular to a longitudinal axis of the body. The portion of the body has an arcuate connecting surface on an external periphery thereof. The body cooperates with the first component to permit the portion of the body to freely pass through a first component opening in the first component. The body cooperates with the second component to permit the portion of the body to freely pass through a second component opening in the second component when the body is oriented in a first position with respect to the second component opening. The body cooperates with the second component to permit the arcuate connecting surface to engage with the second component when the body is oriented in a second position with respect to the second component opening. The head is attached to one end of the elongated body. The head and the arcuate connecting surface cooperate to secure the first component and the second component to each other.

The invention will be described in detail herein with reference to the following figures in which like reference numerals denote like elements and wherein:

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 11:
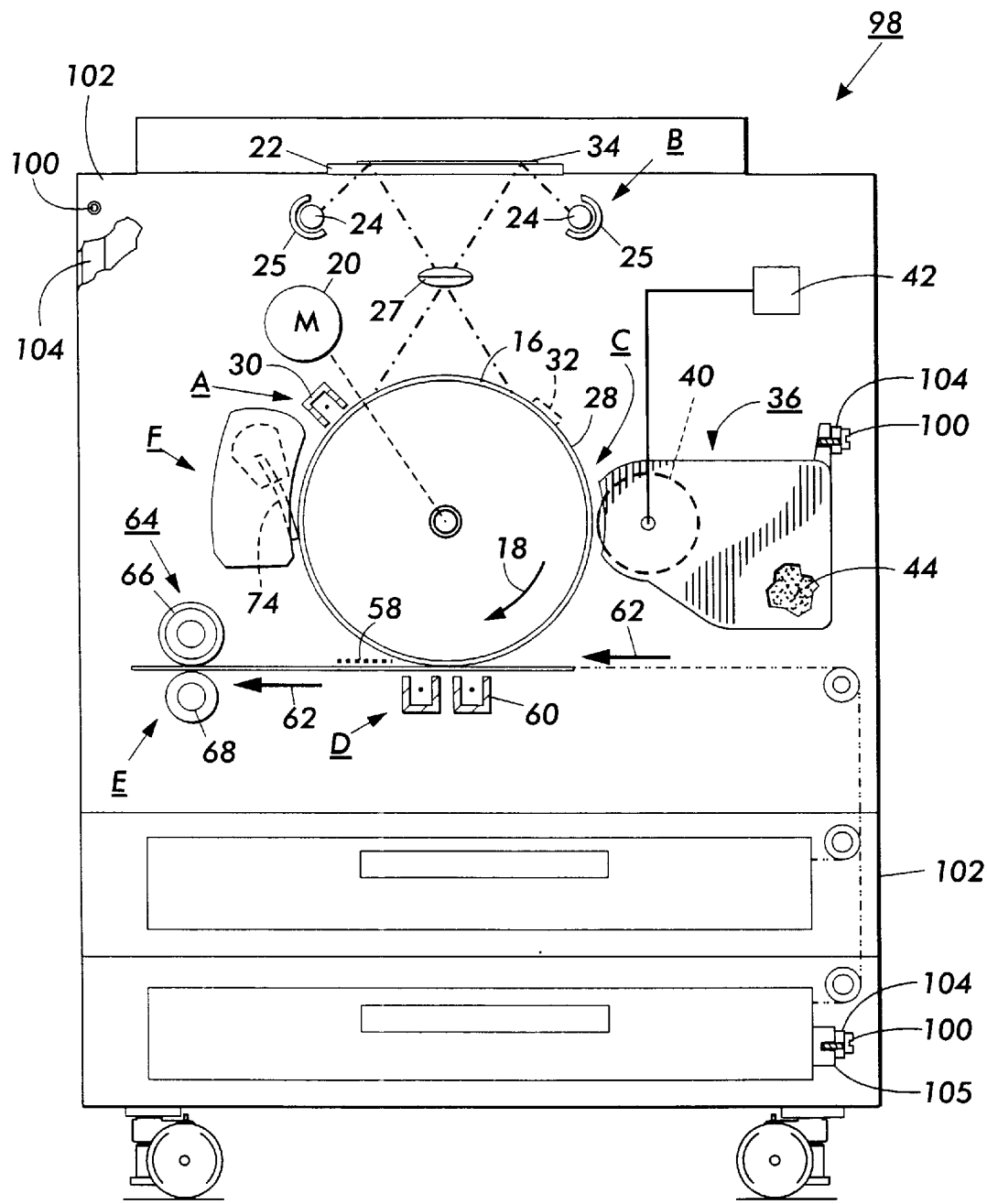
FIG. 11 is a schematic elevational view of an electrophotographic printing machine incorporating the FIG. 1 fastener therein.

For a general understanding of the illustrative electrophotographic printing machine incorporating the features of the present invention therein, reference is made to the drawings. In the drawings, like reference numerals have been used throughout to designate identical elements. FIG. 11 schematically depicts the various components of an electrophotographic printing machine incorporating the fastener of the present invention therein. Although the fastener of the present invention is particularly well adapted for use in the illustrative printing machine, it will become evident that the fastener is equally well suited for use in a wide variety of printing machines and are not necessarily limited in its application to the particular embodiment shown herein.

Referring now to FIG. 11, the electrophotographic printing machine shown employs a photoconductive drum 16, although photoreceptors in the form of a belt are also known, and may be substituted therefor. The drum 16 has a photoconductive surface deposited on a conductive substrate. Drum 16 moves in the direction of arrow 18 to advance successive portions thereof sequentially through the various processing stations disposed about the path of movement thereof. Motor 20 rotates drum 16 to advance drum 16 in the direction of arrow 18. Drum 16 is coupled to motor 20 by suitable means such as a drive.

Initially successive portions of drum 16 pass through charging station A. At charging station A, a corona generating device, indicated generally by the reference numeral 30, charges the drum 16 to a selectively high uniform electrical potential, preferably negative. Any suitable control, well known in the art, may be employed for controlling the corona generating device 30.

A document 34 to be reproduced is placed on a platen 22, located at imaging station B, where it is illuminated in known manner by a light source such as a tungsten halogen lamp 24. The document thus exposed is imaged onto the drum 16 by a system of mirrors 25 and lens 27, as shown. The optical image selectively discharges the surface 28 of the drum 16 in an image configuration whereby an electrostatic latent image 32 of the original document is recorded on the drum 16 at the imaging station B.

It should be appreciated that the printing machine may be a digital printing machine. In a digital printing machine a ROS (Raster Output Scanner) may lay out the image in a series of horizontal scan lines with each line having a specific number of pixels per inch. The ROS may include a laser(not shown) having a rotating polygon mirror block associated therewith. The ROS exposes the photoconductive surface of the printer.

At development station C, a magnetic development system or unit, indicated generally by the reference numeral 36 advances developer materials into contact with the electrostatic latent images. Preferably, the magnetic developer unit includes a magnetic developer roller mounted in a housing. Thus, developer unit 36 contains a magnetic roller 40. The roller 40 advances toner particles into contact with the latent image. Appropriate developer biasing is may be accomplished via power supply 42, electrically connected to developer unit 36.

The developer unit 36 develops the charged image areas of the photoconductive surface. This developer unit contains magnetic black toner, for example, particles 44 which are charged by the electrostatic field existing between the photoconductive surface and the electrically biased developer roll in the developer unit. Power supply 42 electrically biases the magnetic roll 40.

A sheet of support material 58 is moved into contact with the toner image at transfer station D. The sheet of support material is advanced to transfer station D by a suitable sheet feeding apparatus, not shown. Preferably, the sheet feeding apparatus includes a feed roll contacting the uppermost sheet of a stack copy sheets. Feed rolls rotate so as to advance the uppermost sheet from the stack into a chute which directs the advancing sheet of support material into contact with the photoconductive surface of drum 16 in a timed sequence so that the toner powder image developed thereon contacts the advancing sheet of support material at transfer station D.

Transfer station D includes a corona generating device 60 which sprays ions of a suitable polarity onto the backside of sheet 58. This attracts the toner powder image from the drum 16 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a pressure roller 68. Sheet 58 passes between fuser roller 66 and pressure roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator. It will also be understood that other post-fusing operations can be included, for example, stapling, binding, inverting and returning the sheet for duplexing and the like.

After the sheet of support material is separated from the photoconductive surface of drum 16, the residual toner particles carried by image and the non-image areas on the photoconductive surface are charged to a suitable polarity and level by a preclean charging device (not shown) to enable removal therefrom. These particles are removed at cleaning station F. The cleaner unit is disposed at the cleaner station F. The cleaner unit may include a blade 74 that tends to scrape the residual toner particles from the drum 16 and then deposit them into a waste container. Subsequent to cleaning, a discharge lamp or corona generating device (not shown) dissipates any residual electrostatic charge remaining prior to the charging thereof for the next successive imaging cycle.

It is believed that the foregoing description is sufficient for purposes of the present application to illustrate the general operation of an electrophotographic printing machine incorporating the development apparatus of the present invention therein.

According to the present invention and referring again to FIG. 11, a fastener 100 according to the present invention is shown in use on device or printer 98. The fastener 100 may be used for example to interconnect a first component, for example a cover 102 to a second component, for example a frame 104. The fastener 100 may likewise be used to interconnect the developer unit 36 to the frame 104. Also the fastener 100 may be used to interconnect a paper tray rail 105 to the frame 14.

Figure 1:
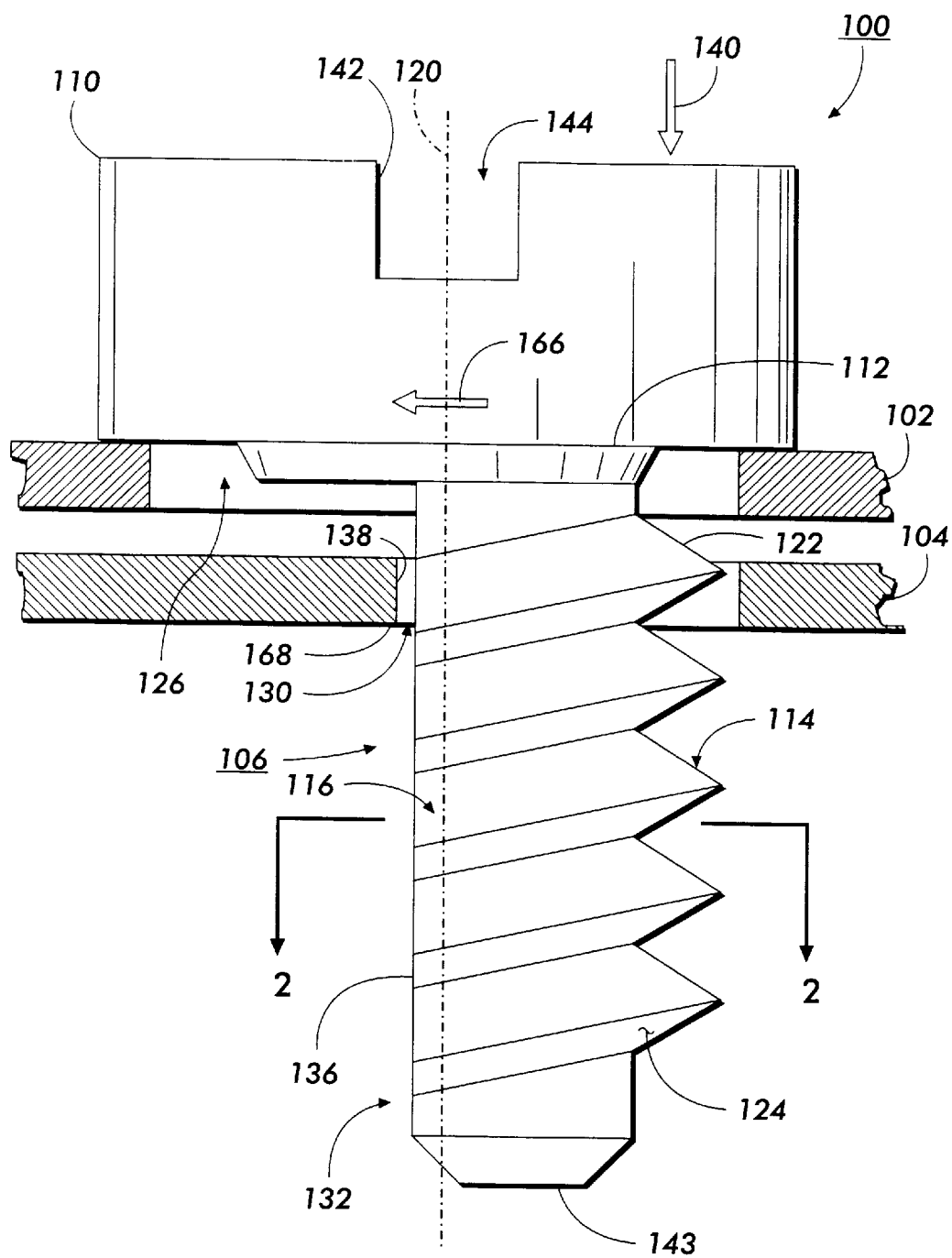
FIG. 1 is a plan view of a fastener according to the present invention in cooperation with the first component of FIG. 4 and with the second component of FIG. 3 partially in cross section with the connecting surface in clearance with the second component.

Referring now to FIG. 1, a quick insertion screw according to the present invention is shown as insertion screw 100. The screw 100 is utilized for securing the first component 102 to the second component 104 in a device, for example, printing machine 98 (see FIG. 11). The screw 100 includes an elongated body 106 and a head 110. The head 110 is attached to first end 112 of the elongated body 106.

The elongated body 106 has a portion 114 of the body 106 which has a cross section 116 perpendicular to longitudinal axis 120 of the body 106. The portion 114 of the body 106 has an arcuate connecting surface 122 on an external periphery 124 of the portion 114 of the body 106. The body 106 cooperates with the first component 102 to permit the portion 114 of the body 106 to freely pass through a first component opening 126 in the first component 102. The body 106 further cooperates with the second component 104 to permit the portion 114 of the body 106 to freely pass through a second component opening 130 in the second component 104 when the body 106 is oriented in a first position 132 with respect to the second component opening 130. The body 106 further cooperates with the second component 104 to permit the arcuate connecting surface 122 to engage with the second component 104 when the body 106 is oriented in a second position 134 (see FIG. 7) with respect to the second component opening 130. The head 110 and the arcuate connecting surface 122 cooperate to secure the first component 102 and the second component 104 to each other.

Figure 6:
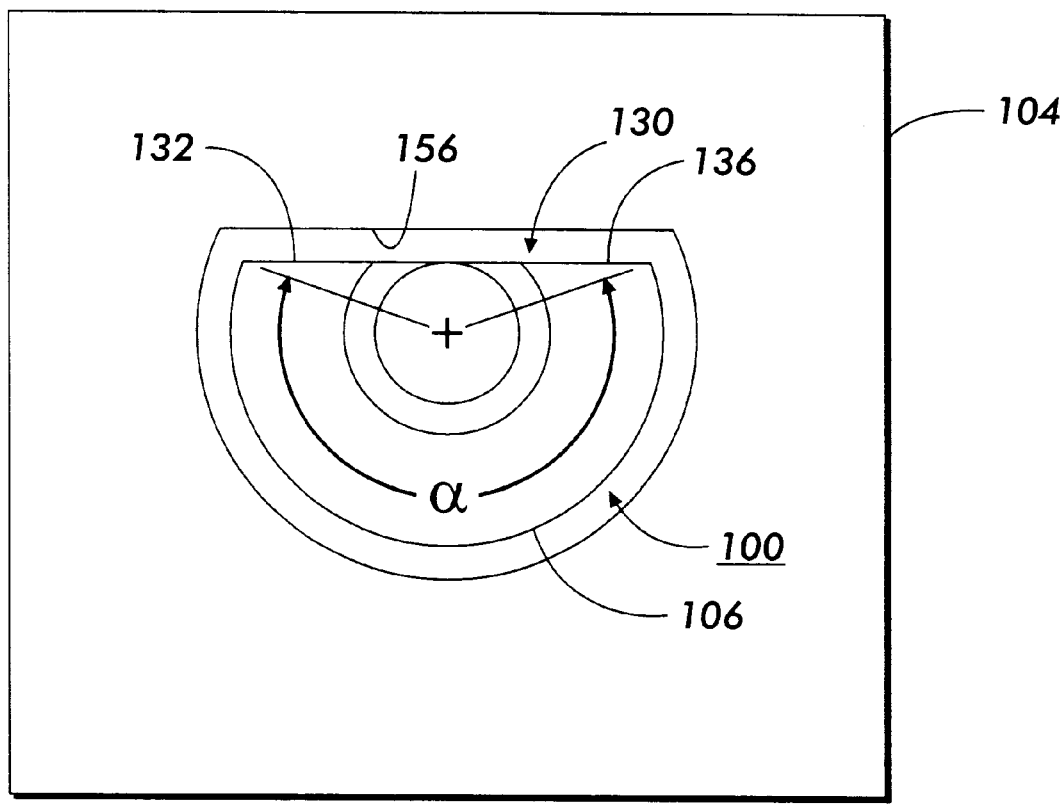
FIG. 6 is an end view of the fastener of FIG. 1 in cooperation with the first component of FIG. 4 and with the second component of FIG. 3 partially in cross section with the connecting surface in clearance with the second component.

The body 106 may cooperate with the second component 104 to permit the portion 114 of the body to pass through the second component 104 when the body 106 is oriented in the first position 132 with respect to the second component 104 with the second component 104 and the body 106 having any suitable shapes capable of providing for such passage in the first position 132 and prohibiting such passage in the second position 134 (see FIG. 6).

For example, and as shown in FIG. 1, the external periphery 124 of the body 106 may include a surface 136 which is in clearance with surface 138 of the second component 104 when the screw 100 is installed in the direction of arrow 140 along longitudinal axis 120 of the screw 100. For example and as shown in FIG. 1, the screw 100, the surface 136 of the body 106 may be in the form of a flat and correspondingly, the surface 138 of the second component 104 may likewise be in the form of a flat. The flats 136 and 138 are in clearance with each other as the fastener is installed in the direction of arrow 100 when the body 106 is in the first position 132 with respect to the second component 104.

Preferably and as shown in FIG. 1, the screw 100 includes a rotating feature 142 for rotating the screw 100 from the first position 132 to the second position 134. Preferably the rotating feature 142 is associated with the head 110. It should be appreciated that the rotating feature may alternatively be associated with second end 143 of the body 106. The rotating feature 142 may be in the form of any feature capable of rotating or applying torque to the screw 100. For example, the rotating feature 142 may be in the form of external flats (not shown) on the head 110 or in the form of an interior driver located in recess 144 of the head 110. For example and as shown in FIG. 1, the rotating feature 142 is in the form of a slot located within the recess 144.

Figure 2:
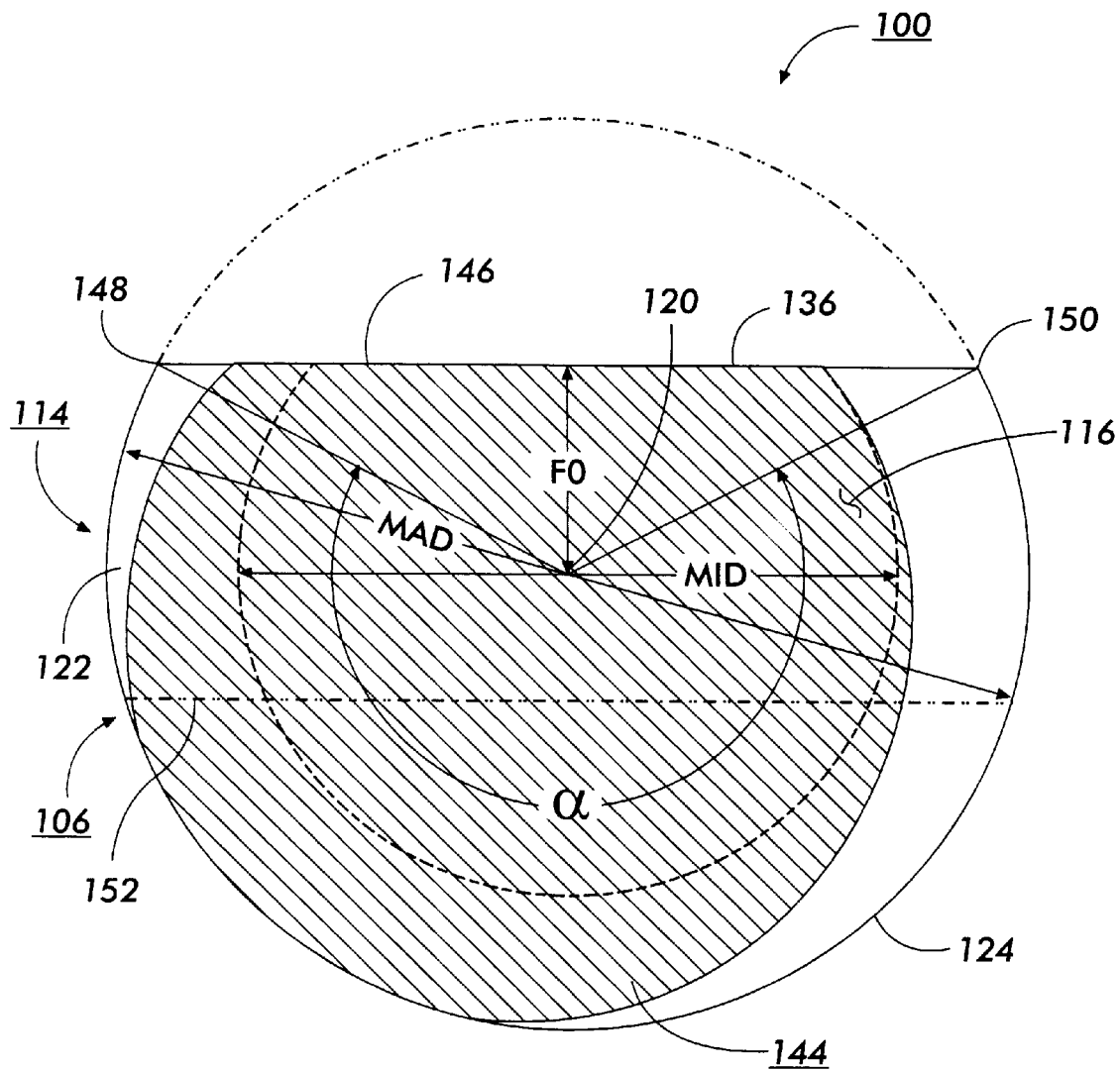
FIG. 2 is a cross sectional view along the line 2—2 in the direction of the arrows of the fastener of FIG. 1.

Referring now to FIG. 2, the elongated body of the screw 100 is shown in greater detail. As shown in FIG. 2, the portion 114 of the elongated body 106 has a cross section 116 which is perpendicular to longitudinal axis 120 of the body 106. It should be appreciated that while the cross section 116 is generally uniform along the longitudinal axis 120, the cross section 116 varies as the external periphery 124 and the associated connecting surface 122 varies along the longitudinal axis 120.

Preferably and as shown in FIG. 2, the connecting surface 122 includes a portion which is curved or arcuate. Preferably, and as shown in FIG. 2, the connecting surface 122 may be in the form of a portion of a spiral or helical thread.

As shown in FIG. 2, the cross section 116 is preferably bounded by an arcuate portion 144 and a linear portion 146 connected to the arcuate portion 144. The arcuate portion 144 and the linear portion 146 cooperate with the opening 130 of the second component 104 (see FIG. 3) to provide for the insertion of the screw 100 and for the securing of the screw 100 to the second component 104. It should be appreciated that the linear portion 146 may be positioned relative to the arcuate portion 144 with a significant amount of design latitude provided that the body 106 of the screw 100 may be inserted into the opening 130 of the second component 104 and yet be rotated into engagement with the second component 104. As shown in FIG. 2, the linear portion 146 may be positioned relative to the arcuate portion 144 such that the arcuate portion 144 is defined by an angle α from the first end 148 of the linear portion 146 to the second end 150 of the linear portion 146 and centerline 120. The included angle α may vary from for example 280 degrees to 120 degrees. If the included angle α is equal to or greater than 180 degrees, the linear portion 146 extends past longitudinal centerline 120 a distance FO. It should be appreciated that the invention may be practiced with the arcuate portion 146 defining an included angle of less than 180 degrees with the linear portion as shown in phantom line 152 not extending toward longitudinal axis 120.

As shown in FIG. 2, the connecting surface 122 may be in the form of a spiral thread. The connecting surface 122 thus extends from minor diameter defined by MID to the major defined by MAD. The proper selection of the shape of the cross section 116 of the screw 100 may depend on the minor diameter MID as it relates to the major diameter MAD as well as the included angle α.

Figure 3:
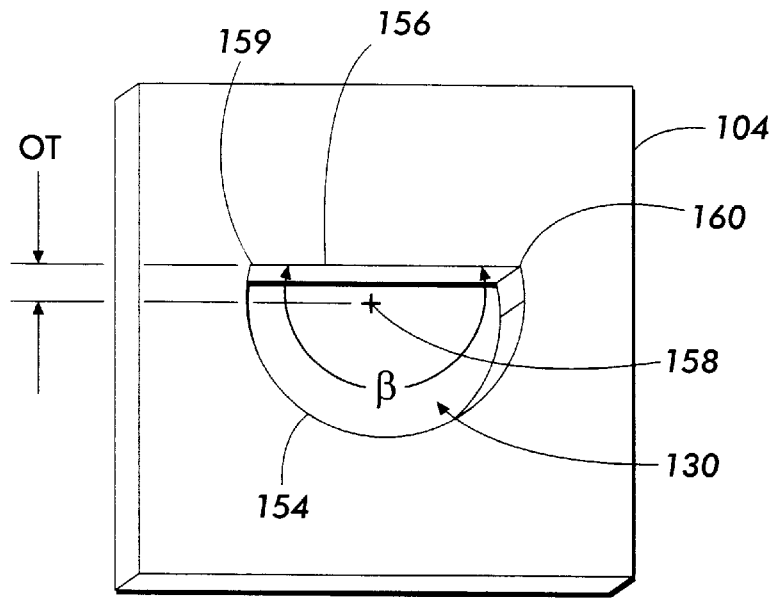
FIG. 3 is a perspective view of a second component cooperable with the fastener of FIG. 1.

Referring now to FIG. 3, the second component 104 is shown in greater detail. Preferably, and as shown in FIG. 3, the second component opening has a cross sectional shape which is generally similar to the cross section 116 of the screw 100 (see FIG. 2) so that the screw 100 may slidably pass along the second component opening 130. As shown in FIG. 2, for simplicity and manufacturing, the second component 104 as well as for simplicity for the manufacture of the screw 100, the second component opening 130 includes an arcuate portion 154 and a straight portion 156 which is connected to the arcuate portion 154.

As shown in FIG. 3, the arcuate portion 154 is in the form of a portion of a circle having center point defined by second opening axis 158. The arcuate portion 154 therefore is defined by diameter CD as well as by an included angle β extending from first end 159 of the straight portion to second end 160 of the straight portion 156. The angle β preferably is similar to the angle α of the body 106 of the screw 100 (see FIG. 2). For example, the angle β may range from 120 degrees to 280 degrees. When the angle β exceeds 180 degrees, the straight portion 156 may be placed a distance OT from axis 158.

Figure 4:
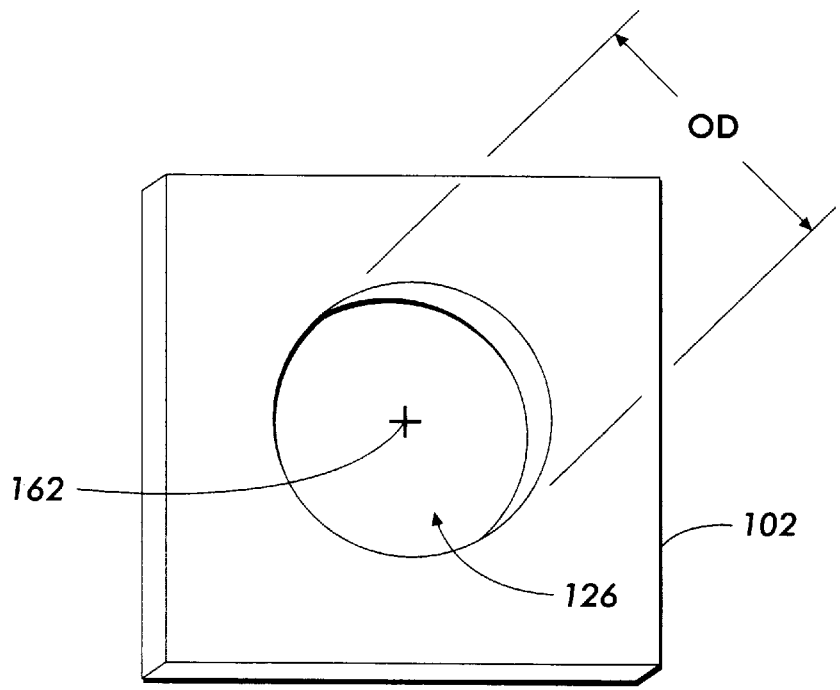
FIG. 4 is a perspective view of a first component cooperable with the fastener of FIG. 1.

Referring now to FIG. 4, the first component 102 is shown in greater detail. The first component 102 includes a first component opening 126 through which the body 106 of the screw 100 may freely pass. The first component opening 126 for simplicity may be in the form of a circle having a diameter OD and centered along first opening axis 162.

Figure 5:
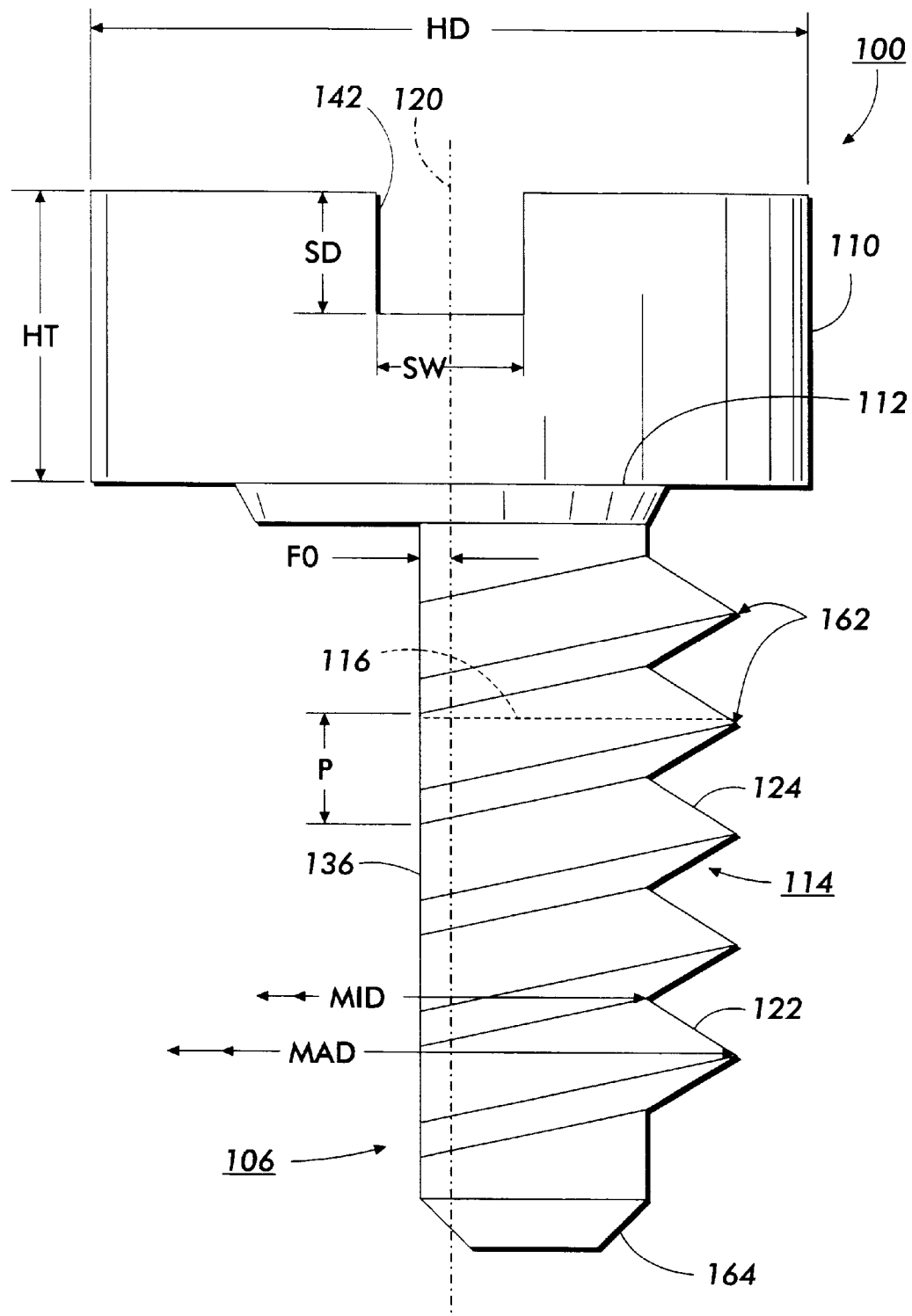
FIG. 5 is a plan view of the fastener of FIG. 1.

Referring now to FIG. 5, the fastener 100 is shown in greater detail. While the head 110 of the fastener 100 may have any suitable shape, for example, as shown in FIG. 5, the head 110 of the fastener 100 has a cylindrical head defined by head diameter HD and has a thickness HT along the longitudinal axis 120. The dimensions HD and HT are selected to provide ample strength and support for the fastener 100. For example, for a fastener 100 including 1/4–20 threads, the head diameter HD may be 0.4 inches and the head thickness HT may be 0.15 inches. It should be appreciated that the fastener 100 may be of any size.

The head 110 preferably includes the rotating feature 142 in the form of a slot. The slot 142 cooperates with, for example, a 1/4–20 thread on the body 106 and may have a slot width SW of for example 0.1 inch and a slot depth SD of for example 0.05 inches.

While the fastener 100 may include any connecting surface 122 capable of securing the second component 104 to the fastener 100, for example, and for simplicity, the connecting surface 122 is arcuate and preferably in the form of a spiral thread. The spiral thread provides for a simplicity of construction and enhanced strength as well as a positive securing method to secure the component 104 to the fastener 100. While it should be appreciated that the fastener 100 may include a solitary thread, as shown in FIG. 4 the body 106 of the fastener 100 includes a plurality of threads 162.

Each adjacent thread 162 is separated by a distance P represented as a pitch. The fastener 100 preferably utilizes a standard thread configuration utilizing a standard pitch. The threads 162 may either be a standard inch design or a standard metric design. For example, the fastener 100 may be a 1/4–20 inch thread having a major diameter MAD of 0.25 inches and having 20 threads per inch or a pitch P of 0.05 inches. As shown in FIG. 4, the fastener 100 may include a lead-in feature in the form of a chamfer 164 for assisting in guiding the body 106 into the first and second component openings 126 and 130, respectively.

Referring now to FIG. 6, the fastener 100 is shown installed into the second component 104 in first position 132 with the flat 136 of the body 106 being parallel and spaced from the flat 156 of the second component 104. It should be appreciated that the fastener 100 may be installed into the second component opening 130 by merely aligning the fastener flat 136 with the second component flat 156.

Referring again to FIG. 1, the screw 100 is shown with the body 106 of the screw 100 installed through the opening 126 of the first component 102 and with the body 106 installed into the second component opening of the second component 104. It should be appreciated that as the screw 100 is rotated in the direction of arrow 166, the connecting surface 122 of the body 106 moves toward contact with leading edge 168 of the second component 104.

Figure 7:
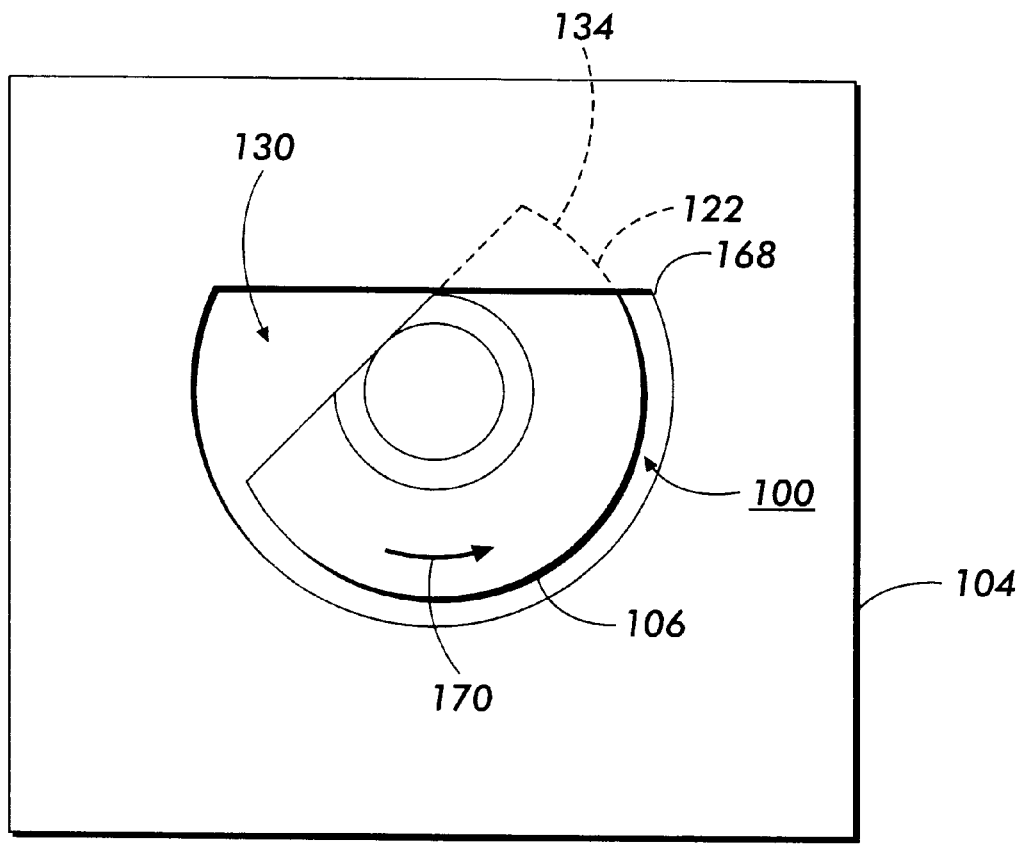
FIG. 7 is an end view of the fastener of FIG. 1 in cooperation with the first component of FIG. 4 and with the second component of FIG. 3 partially in cross section with the connecting surface matingly engaged with the second component.

Referring now to FIG. 7, as the fastener 100 continues to be rotated in the direction of arrow 170, the arcuate connecting surface 122 extends past leading edge 168 of the second component 104 and secures the fastener 100 to the second component 104 in second position 134.

Figure 8:
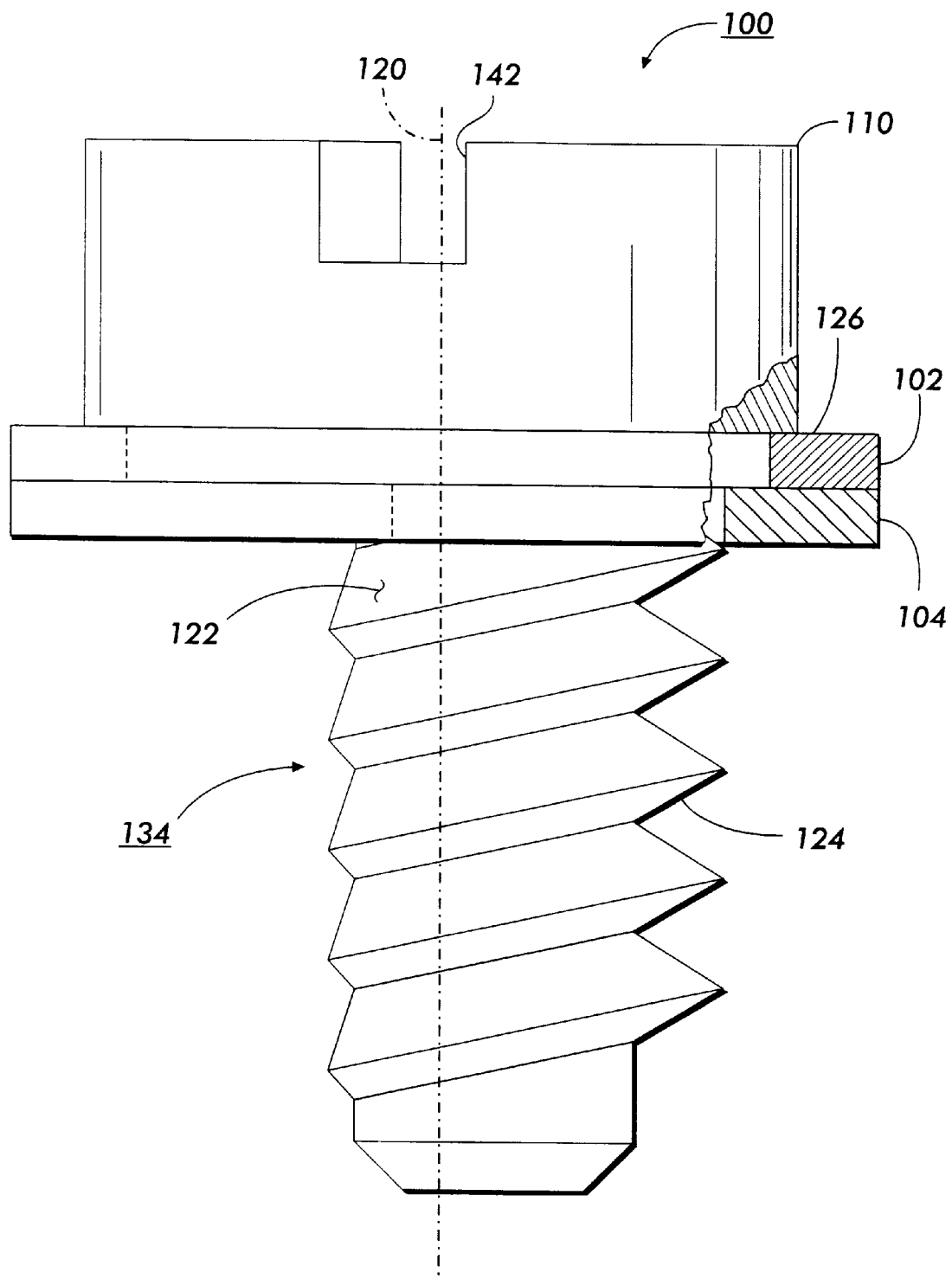
FIG. 8 is an end plan view of the fastener of FIG. 1 in cooperation with the first component of FIG. 4 and with the second component of FIG. 3 partially in cross section with the connecting surface matingly engaged with the second component.

Referring now to FIG. 8, the screw 100 is shown in the second or fully assembled position 134. As can be shown in FIG. 8, the first component 102 is positioned tightly between the second component 104 and the head 110 of the fastener 100. The second component 104 is tightly positioned between the arcuate connecting surface 122 and the first component 102. The fastener 100 thus serves to secure the first component 102 to the second component 104.

Figure 9:
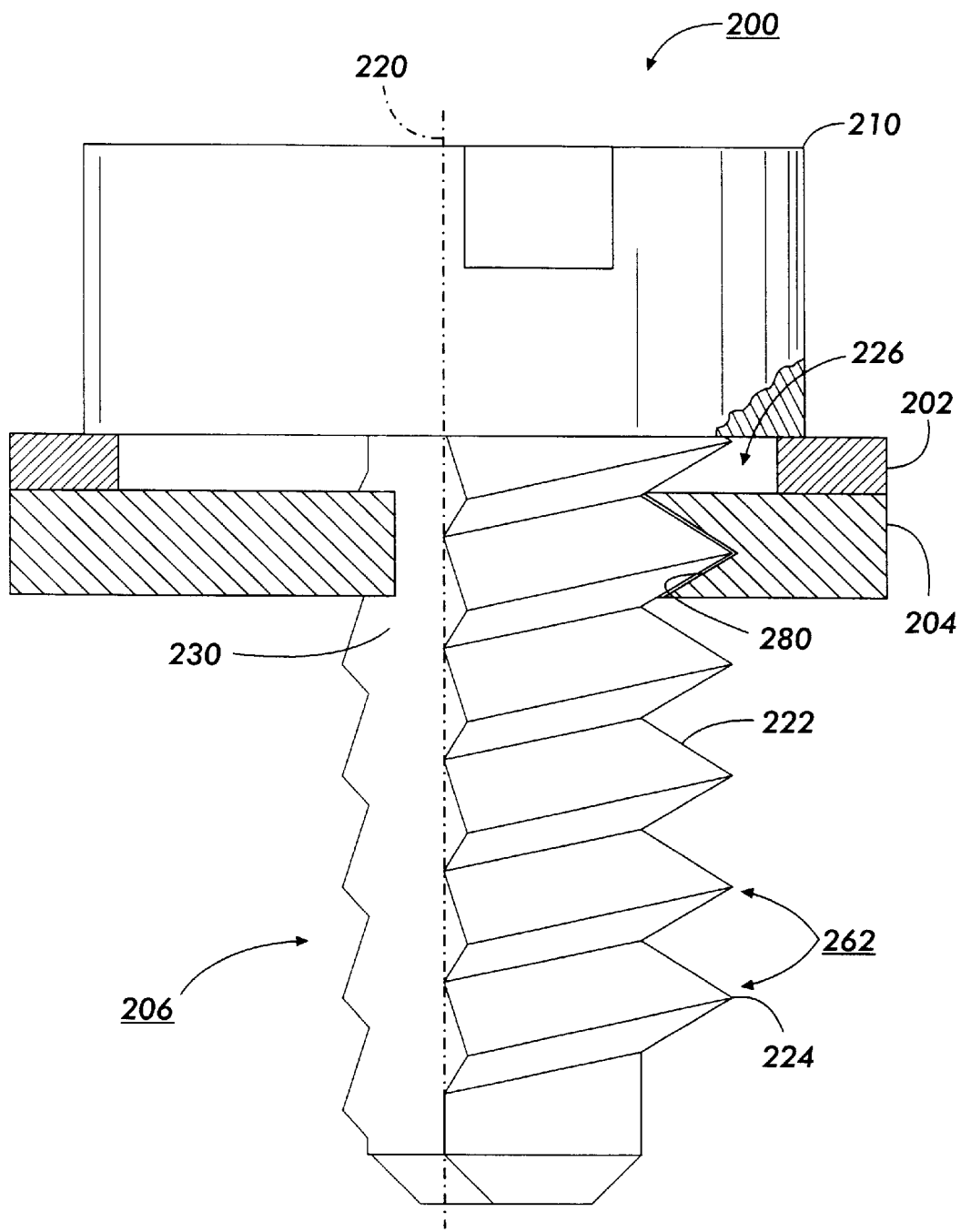
FIG. 9 is a plan view of another embodiment of a fastener according to the present invention in cooperation with the first component of FIG. 3 and with another embodiment of a second component partially in cross section with the connecting surface matingly engaged with the second component.

An alternate embodiment of the present invention is shown in FIG. 9 as fastener 200. Fastener 200 is substantially similar to fastener 100 of FIG. 1. The head 210 is substantially similar to head 110 of fastener 100. The body 206 is substantially similar to the body 106 of fastener 100. The body 206 of the fastener 200 is similar to fastener 100 and includes a plurality of threads 262. The threads 262 are positioned on external periphery 224 of the body 206. The threads 262 serve as the connecting surface 222 for connecting the fastener 200 and the first component 202 to the second component 204. The first component 202 is similar to the first component 102 of the fastener 100 and includes a first component opening 226 similar to the first component opening 126 of the fastener 100.

The second component 204 is different from the second component 104 of the fastener 100. The second component 204 includes internal threads 280 which mate with the external threads 262 of the body 206 of the fastener 200. The internal threads 280 serve to provide an improved contact and support with the body 206 of the fastener 200. The utilization of the internal threads 280 adds to the cost and complexity of the second component 204 but may improve the holding strength of the fastener 200.

Figure 10:
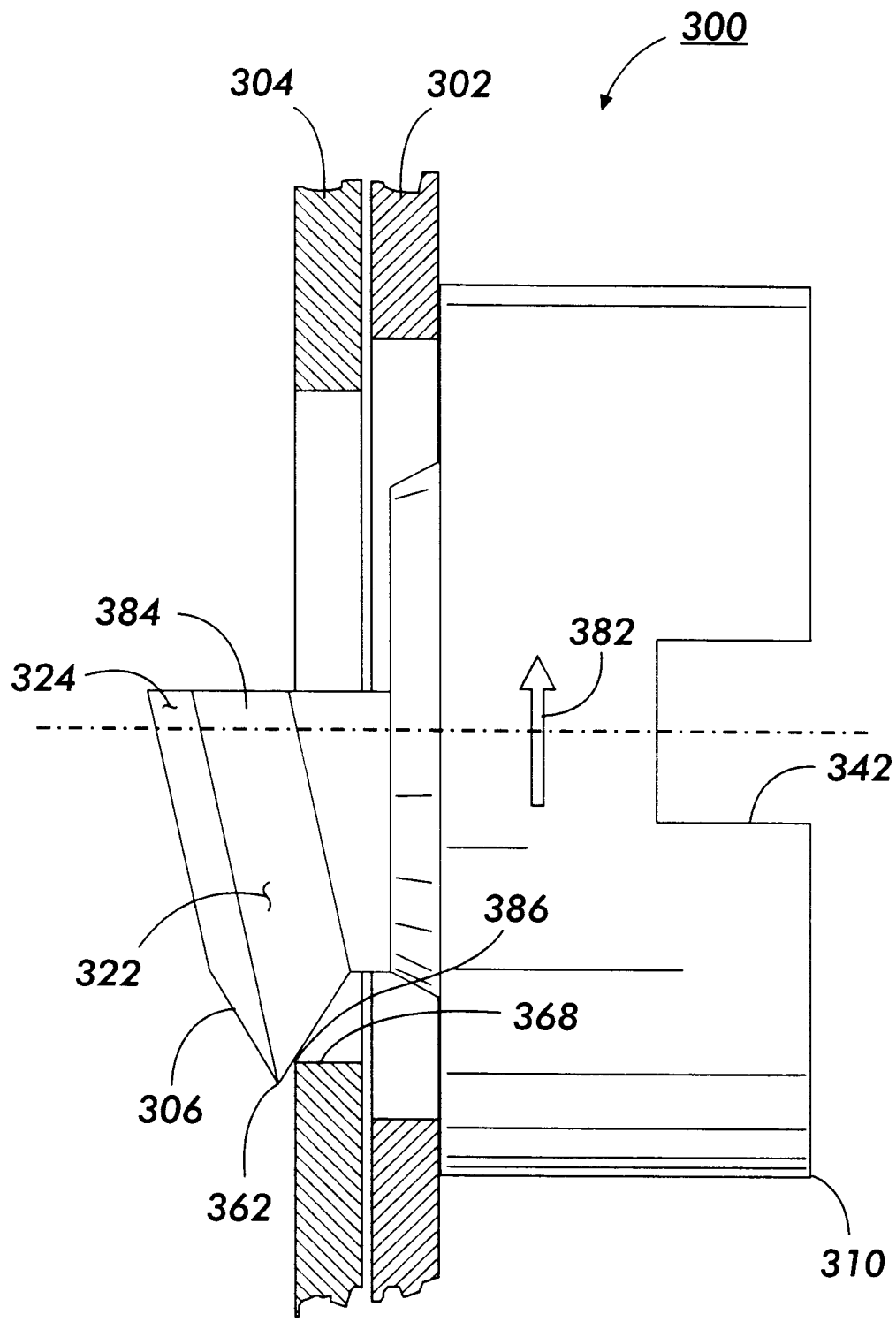
FIG. 10 is a plan view of an alternate embodiment of a fastener according to the present invention having a solitary thread.

While it should be appreciated that the fastener may include a plurality of threads, as shown in FIG. 10, the fastener according to the present invention may alternatively include a solitary thread. The fastener 300 is similar to the fastener 100 of FIG. 1. The head 310 is similar to head 110 of fastener 100. The rotating feature 342 of the fastener 300 is similar to slot 142 of fastener 100. The fastener 300 is utilized to secure the first component 302 which is similar to first component 102 of fastener 100 to second component 304 which is similar to second component 104 of fastener 100. The fastener 300 includes an external periphery 324 similar to external periphery 124 of fastener 100 and includes a contact surface 322 similar to contact surface 122.

Body 306 is different from body 106 of fastener 300 in that body 306 includes a solitary thread 362 rather than a plurality of threads 162. The contact surface 322 of the thread 362 is rotated in the direction of arrow 382 such that leading edge 368 of the second component 304 advances from first position 384 to second position 386 to secure the first component 302 against the second component 304.

By providing a quick inserting screw having a connecting surface with a similar profile, a screw may be provided with quicker assembly times as well as quicker disassembly times.

By providing a screw having a first position for installation and a second position for engagement with a locating feature, a quick assembly time and a quick disassembly time may be utilized.

By providing a quick assembly screw with an arcuate surface mating with an arcuate surface on a locating feature, a secure connection capable of maintaining significant clamping force may be had.

By providing a quick insertion screw including a flat which mates with a flat on a connecting feature of another component, a consertion screw may be had which reduces assembly time as well as disassembly time while providing an enhanced clamping capacity.

By providing a fastener with a solitary thread portion engagable with a mating component, a fastener may be had which has quicker assembly times, quicker disassembly times, and may simple, inexpensive and have improved strength capacity.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A fastener for securing a first component to a second component in a device, said fastener comprising:

an elongated body, said elongated body having a portion thereof having a cross section perpendicular to a longitudinal axis of said body, the cross section of said elongated body defined by an arcuate connecting surface on an external periphery thereof and one or more intersecting surfaces with a first and second end of the arcuate connecting surface, the arcuate connecting surface extending an angle ranging from about 120 degrees and about 280 degrees between the first and second end, said elongated body adapted to cooperate with a first component and a second component to permit the portion of said elongated body to pass through an opening in the second component when said body is oriented in a first position with respect to the second component opening and to permit the arcuate connecting surface to engage with the second component when said elongated body is oriented in a second position with respect to the second component opening; and a head attached to one end of the elongated body, said head and the arcuate connecting surface cooperating to secure the first component and said second component to each other.

2. A fastener according to claim 1, wherein the cross section includes a portion thereof having an arcuate periphery with an arcuate connecting surface positioned on the arcuate periphery.

3. A fastener according to claim 1, wherein the cross section is a truncated circle.

4. A fastener according to claim 1, wherein the cross section is bounded by a semi-circular portion and a linear portion connected to the semicircular portion.

5. A fastener according to claim 4, wherein the semicircular portion is bounded by an included angle.

6. A fastener according to claim 1, wherein said body is engagable with said second component by rotating at least one of said body and the second component with respect to each other about the longitudinal axis.

7. A fastener according to claim 6, wherein said body is engagable with said second component by rotating at least one of said body and the second component with respect to each other about the longitudinal axis an angle of 0 degrees to 180 degrees.

8. A fastener according to claim 1, wherein the arcuate connecting surface on the external periphery of said body comprises a spiral thread.

9. A fastener according to claim 8, wherein the arcuate connecting surface of said body comprises a plurality of threads.

10. A fastener according to claim 8, wherein the spiral thread of said body is cooperable with an internal thread on the second component.

11. A fastener for securing a first component to a second component in a printing machine, said fastener comprising:

an elongated body, said elongated body having a portion thereof having a cross section perpendicular to a longitudinal axis of said body, the cross section being bounded by a semi-circular portion of at least about 120 degrees and a linear portion connected to the semi-circular portion, the portion of said body having a spiral thread on an external periphery thereof, said body cooperating with the first component to permit the portion of said body to freely pass through a first component opening in the first component, said body cooperating with the second component to permit the portion of said body to freely pass through a second component opening in the second component when said body is oriented in a first position with respect to the second component opening and said body cooperating with the second component to permit the spiral thread to engage with the second component when said body is rotated with respect to the second component about the longitudinal axis; and a head attached to one end of the elongated body, said head and the spiral thread cooperating to secure the first component and said second component to each other.

12. An electrophotographic printing machine of the type having a fastener for securing a first component to a second component in a device, said fastener comprising:

an elongated body, said elongated body having a portion thereof having a cross section perpendicular to a longitudinal axis of said body, the portion of said body having an arcuate connecting surface on an external periphery thereof, the arcuate connecting surface extending an angle of at least about 120 degrees, said body cooperating with the first component to permit the portion of said body to freely pass through a first component opening in the first component, said body cooperating with the second component to permit the portion of said body to freely pass through a second component opening in the second component when said body is oriented in a first position with respect to the second component opening and said body cooperating with the second component to permit the arcuate connecting surface to engage with the second component when said body is oriented in a second position with respect to the second component opening; and a head attached to one end of the elongated body, said head and the arcuate connecting surface cooperating to secure the first component and said second component to each other.

13. A printing machine according to claim 12, wherein the cross section includes portion thereof having an arcuate-periphery, the arcuate connecting surface positioned on the arcuate periphery.

14. A printing machine according to claim 12, wherein the cross section is a truncated circle.

15. A printing machine according to claim 12, wherein the cross section is bounded by a semi-circular portion and a linear portion connected to the semi-circular portion.

16. A printing machine according to claim 15, wherein the semi-circular portion is bounded by an included angle.

17. A printing machine according to claim 12, wherein said body is engagable with said second component by rotating at least one of said body and the second component with respect to each other about the longitudinal axis.

18. A printing machine according to claim 17, wherein said body is engagable with said second component by rotating at least one of said body and the second component with respect to each other about the longitudinal axis an angle of 0 degrees to 180 degrees.

19. A printing machine according to claim 12, wherein the arcuate connecting surface on the external periphery of said body comprises a spiral thread.

20. A printing machine according to claim 19, wherein the arcuate connecting surface of said body comprises a plurality of threads.

21. A printing machine according to claim 19, wherein the spiral thread of said body is cooperable with an internal thread on the second component.

* * * * *